US009046423B2

(12) United States Patent
Piper

(10) Patent No.: US 9,046,423 B2
(45) Date of Patent: Jun. 2, 2015

(54) HYBRID MECHANICAL AND ELECTRICAL TRANSFORMER MONITOR

(75) Inventor: John Rolland Piper, Clifton Springs, NY (US)

(73) Assignee: Qualitrol Company, LLC, Fairport, NY (US)

( * ) Notice: Subject to any disclaimer, the term of this patent is extended or adjusted under 35 U.S.C. 154(b) by 338 days.

(21) Appl. No.: 13/564,601

(22) Filed: Aug. 1, 2012

(65) Prior Publication Data
US 2014/0036958 A1 Feb. 6, 2014

(51) Int. Cl.
| | |
|---|---|
| *G01K 1/14* | (2006.01) |
| *G01K 5/00* | (2006.01) |
| *G01K 7/00* | (2006.01) |
| *G01K 13/00* | (2006.01) |

(52) U.S. Cl.
CPC .. *G01K 5/00* (2013.01); *G01K 7/00* (2013.01); *G01K 13/00* (2013.01)

(58) Field of Classification Search
CPC ......... G01D 5/353; G01K 13/00; G01K 7/00; G01K 1/14
USPC ......... 374/152, 163, 208, 141–147, 195, 204, 374/100, 203, 205–207
See application file for complete search history.

(56) References Cited

U.S. PATENT DOCUMENTS

| | | | | |
|---|---|---|---|---|
| 1,879,276 | A * | 9/1932 | Isaac | 374/152 |
| 1,970,219 | A * | 8/1934 | Bloch | 374/196 |
| 2,794,451 | A * | 6/1957 | Schmidt | 141/1 |
| 2,917,701 | A * | 12/1959 | Salton | 361/37 |
| 3,631,717 | A * | 1/1972 | Kato et al. | 374/40 |
| 4,343,154 | A * | 8/1982 | Jarret et al. | 60/527 |
| 4,745,571 | A * | 5/1988 | Foster | 700/299 |
| 4,775,245 | A * | 10/1988 | Hagerman et al. | 374/134 |
| 5,018,874 | A * | 5/1991 | Weynant | 374/205 |
| 6,086,249 | A | 7/2000 | Urich | |
| 7,322,744 | B2 * | 1/2008 | Ferguson et al. | 374/195 |
| 8,087,825 | B2 * | 1/2012 | Weiss | 374/203 |
| 2005/0106040 | A1 * | 5/2005 | Repple et al. | 417/313 |
| 2006/0251147 | A1 * | 11/2006 | Balan | 374/152 |

(Continued)

FOREIGN PATENT DOCUMENTS

| | | | |
|---|---|---|---|
| GB | 2241576 A | * | 9/1991 |
| JP | 60200136 A | * | 10/1985 |

(Continued)

OTHER PUBLICATIONS

PCT International Search Report dated Nov. 18, 2013 in corresponding International Application No. PCT/US13/52906 (3 pages).
PCT Written Opinion of the International Searching Authority dated v in corresponding International Application No. PCT/US13/52906 (4 pages).

*Primary Examiner* — Gail Kaplan Verbitsky
(74) *Attorney, Agent, or Firm* — Brian B. Shaw, Esq.; Thomas B. Ryan; Harter Secrest & Emery LLP

(57) ABSTRACT

In accordance with the present invention, there is provided a hybrid mechanical and electrical transformer temperature monitor. The mechanical sensing mechanism drives mechanical switches, a local display and a sensing input to the electrical side of the monitor. The electrical portion of the temperature monitor has the ability to calculate winding temperature (with an additional current sensor), data log, actuate electrical switches and has a local display for winding temperature.

5 Claims, 1 Drawing Sheet

(56) References Cited

U.S. PATENT DOCUMENTS

| | | | |
|---|---|---|---|
| 2009/0056655 A1* | 3/2009 | Kobayashi et al. | 123/90.17 |
| 2010/0040112 A1 | 2/2010 | Huck et al. | |
| 2010/0208768 A1 | 8/2010 | Lakner et al. | |
| 2011/0150027 A1* | 6/2011 | Weiss | 374/1 |
| 2013/0243033 A1* | 9/2013 | Asano, Jr. | 374/152 |

FOREIGN PATENT DOCUMENTS

| | | | |
|---|---|---|---|
| JP | 2006112718 A | * | 4/2006 |
| KR | 1020080078314 | | 8/2008 |

\* cited by examiner

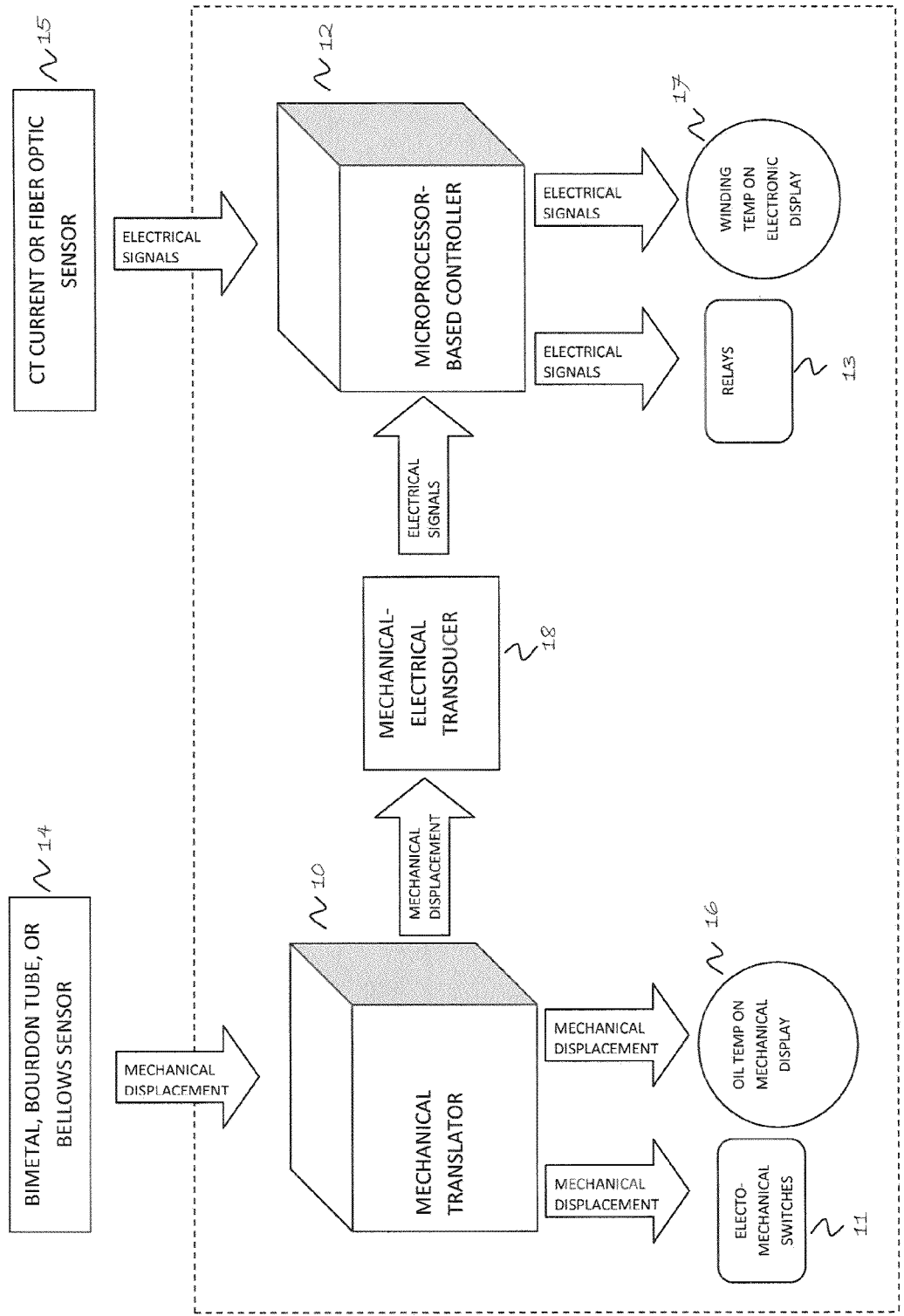

HYBRID MECHANICAL AND ELECTRICAL TRANSFORMER MONITOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to apparatus for measuring oil and winding temperatures in a transformer and, more particularly, to using mechanical means to measure the oil temperature and electrical means to measure the winding temperature.

2. Description of Related Art

Power transformers are an integral and expensive part of the electrical power grid. Since they are such an expensive asset it is in the best interest of the utilities to maximize the length of service of their transformers and one way to do this is by monitoring and controlling the temperature of the transformers. The transformer insulating materials deteriorates with time and temperature at a rate according to an adaptation of the Arrhenius reaction theory so measuring the oil and winding temperatures of a transformer can be used to 1) control the rate of cooling, 2) give guidance on how to load the transformer, and 3) calculate the consumed life of the transformer.

Historically mechanical gauges have measured transformer oil temperatures using bourdon tubes, bellows or bi-metals and then calculated the winding temperatures by adding a heated well or element, to the oil temperature. Electrical gauges have measured transformer oil temperatures using RTDs or thermocouples and then calculating the winding temperatures by measuring the load current. The main advantage of a mechanical oil monitor is that it requires no electricity to operate. It can actuate cooling or alarm switches using only the heat generated from the oil in the transformer. It also has a long history in the industry and is the simplest and most familiar instrument to the greatest number of operations/maintenance personnel. The advantages of electrical monitors are ease of calibration, programmable, digital protocols, data logging, the ability to do calculations, measure winding temperatures and flexibility. We propose to combine the mechanical and electrical metering systems into one Hybrid device thereby maximizing the features of both and minimizing their limitations. By having the mechanical element measure the oil temperature and controlling mechanical switches the Hybrid monitor would continue to function even with loss of electrical power. The electrical portion of the Hybrid monitor would be able to provide all the features and advantages that come with an electronic device such as but not limited to digital protocols, data logging, measuring winding temperatures, ease of calibration, and the like.

In the power industry there are mechanical monitor/controllers that measure the oil temperature using bourdon tubes or bi-metals. Winding temperatures are simulated with heated wells or elements raising the temperature of the oil sensing element of the mechanical monitor/controller.

Electrical gauges measure transformer oil temperatures using RTDs or thermocouples. Winding temperatures are either simulated using loading currents to add to the oil temperature or measured directly using fiber optic probes.

Mechanical gauges have a very limited functionality of only being able to actuate switches for local alarming or controlling cooling.

Electrical gauges have an inherent issue with loss of supply power. Any loss of supply power means a complete loss of functionality. It is possible to back up electrical gauges with batteries or other circuitry but that raises the product cost and complexity. It would be advantageous to provide a transformer monitor having a mechanical sensor providing an oil temperature input to actuate mechanical switches and electrical switches.

It would also be advantageous to provide a transformer monitor that would function with loss of electrical power.

It would further be advantageous to have redundancy in a transformer monitor to measure oil temperature both mechanically and electrically.

It would further be advantageous to provide a transformer monitor that had the ability to measure winding temperature.

It would further be advantageous to provide a transformer temperature monitor that had local displays for both oil and winding temperatures.

It would further be advantageous to provide a transformer temperature monitor that had expanded capabilities such as data logging, winding simulation, loss of life calculations, etc.

BRIEF SUMMARY OF THE INVENTION

Briefly stated and in accordance with one aspect of the invention, a hybrid mechanical and electrical transformer monitor for measuring oil and winding temperature in a transformer includes a mechanical translator for converting the oil temperature input to a mechanical displacement, one or more electromechanical switches connected to the mechanical translator for providing one or more mechanical actuation contacts in response to the displacement, a microprocessor-based controller connected to the mechanical actuation contacts for providing control for the electronic circuitry, at least one relay connected to the microprocessor-based controller for providing one or more electrically controlled actuation outputs, a mechanical sensing input connected to the mechanical translator for providing an oil temperature measurements or mechanical means, electrical temperature sensing input connected to the microprocessor-based controller for providing electrical input for measuring winding temperature, a mechanical display connected to the mechanical translation mechanism for providing a local display of the oil temperature, and electrical display connected to the microprocessor-based controller for providing a local display of the winding temperature.

BRIEF DESCRIPTION OF THE SEVERAL VIEWS OF THE DRAWING(S)

While the novel aspects of the invention are set forth with particularity in the appended claims, various embodiments of the invention may be better understood by reference to the following detailed description thereof taken in conjunction with the accompanying drawings in which:

FIG. 1 is a front detail view of a hybrid transformer temperature monitor.

For purposes of clarity and brevity, like elements and components will bear the same designations and numbering throughout the Figures.

DETAILED DESCRIPTION OF THE INVENTION

FIG. 1 is a block diagram of the hybrid transformer temperature monitor 10. For the purpose of this application the term mechanical sensing input 14 refers to any mechanical means to measure liquid temperature in a transformer and produce a mechanical displacement in response to a change in temperature. These will include but not be limited to: bimetals, bourdon tubes or bellows sensing and other elements that produce a displacement in response to a temperature change. Electrical temperature sensing input 15 will refer to the means to measure winding temperature in a transformer and produce an electrical signal corresponding to the winding temperature and this will include but not be limited to: current measurement devices or fiber optic probes. Mechanical display 16 will refer to any mechanical display that is responsive to the mechanical sensing input and will include but not be limited to: dials with pointers that move in response to a displacement. Electrical display 17 will refer to any electrical display that is responsive to the signal produced by the electrical temperature sensing input and will include but not be limited to: LCD, LED, or neon displays.

The hybrid transformer temperature monitor functions as two monitors in one. The monitor measures oil temperature through the mechanical sensing input 14 and then through a mechanical translator 10 displays the oil temperature on the mechanical display 16. The mechanical sensing input and mechanical translator also control and actuate electro-mechanical switches 11 for generating alarms and controlling cooling. A mechanical-electrical transducer 18 coupled to the mechanical translator or to the sensing input 14 generates corresponding electrical signals to the microprocessor based controller 12 corresponding to the oil temperature. The microprocessor based controller 12 uses this oil temperature signal to calculate winding temperatures and transmit them as electrical signals through digitial protocols. The microprocessor based controller 12 also receives electrical inputs from temperature sensing devices to either use in winding temperature calculations or to measure winding temperatures directly. The microprocessor based controller 12 can also use the oil temperature and winding temperature to control and actuate relays 13 for controlling cooling and/or generating alarms or for other functions.

The hybrid transformer temperature monitor will include but not limited to: the ability to data log winding and oil temperatures, calculate life consumption of the transformer, calculate transformer loading, perform cooling equipment exercising and digital protocols (e.g. DNP 3.0, Modbus, IEC 60870, IEC 61850).

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

The invention claimed is:

1. A hybrid mechanical and electrical transformer monitor for measuring oil and winding temperatures in a transformer, comprising:
   a mechanical translator, for converting the oil temperature input to a mechanical displacement;
   one or more electro-mechanical switches, connected to said mechanical translator for providing one or more electrical outputs in response to said mechanical displacement;
   a microprocessor based controller, connected to said mechanical translator; for controlling electronic circuitry;
   at least one relay, connected to said microprocessor based controller, for providing one or more electrically controlled actuation contacts;
   a mechanical sensing input, connected to said mechanical translator, for providing an oil temperature measurement through mechanical means;
   an electrical temperature sensor, connected to said microprocessor based controller, for providing an electrical input to the controller for measuring winding temperature;
   a mechanical-electrical transducer connected to the mechanical translator and providing an electrical signal to the microprocessor based controller proportional to oil temperature;
   a mechanical display, connected to said mechanical translator and responsive to the displacement, for providing a local display of the oil temperature; and
   an electrical display, connected to said microprocessor based controller, for providing a local display of the winding temperature.

2. The hybrid mechanical and electrical transformer monitor of claim 1 wherein the at least one relay provides for at least one of generating alarms and controlling cooling of the transformer.

3. The hybrid mechanical and electrical transformer monitor of claim 1 wherein the microprocessor based controller receives electrical inputs from the mechanical-electrical transducer and the electrical temperature sensor to calculate or measure winding temperatures.

4. The hybrid mechanical and electrical transformer monitor of claim 1 wherein the microprocessor based controller is responsive to both the electrical signal from the mechanical-electrical transducer and the electrical input from the electrical temperature sensor to control the at least one relay for controlling cooling and/or generating an alarm.

5. The hybrid mechanical and electrical transformer monitor of claim 1 wherein the transformer monitor provides for data logging winding and oil temperatures, calculating life consumption of the transformer, calculating transformer loading, and performing cooling equipment exercising and digital protocols.

* * * * *